US009792542B2

(12) United States Patent
Curtis

(10) Patent No.: US 9,792,542 B2
(45) Date of Patent: Oct. 17, 2017

(54) FACILITY WALKTHROUGH AND MAINTENANCE GUIDED BY SCANNABLE TAGS OR DATA

(71) Applicant: Peter M. Curtis, Bethpage, NY (US)

(72) Inventor: Peter M. Curtis, Bethpage, NY (US)

( * ) Notice: Subject to any disclaimer, the term of this patent is extended or adjusted under 35 U.S.C. 154(b) by 67 days.

(21) Appl. No.: 14/963,389

(22) Filed: Dec. 9, 2015

(65) Prior Publication Data
US 2016/0162772 A1    Jun. 9, 2016

Related U.S. Application Data

(60) Provisional application No. 62/089,633, filed on Dec. 9, 2014.

(51) Int. Cl.
G06K 19/07    (2006.01)
G06F 3/01    (2006.01)
G06K 9/18    (2006.01)
G02B 27/01    (2006.01)

(52) U.S. Cl.
CPC ....... *G06K 19/0727* (2013.01); *G02B 27/017* (2013.01); *G02B 27/0172* (2013.01); *G06F 3/011* (2013.01); *G06K 9/183* (2013.01); *G02B 2027/014* (2013.01); *G02B 2027/0138* (2013.01); *G02B 2027/0178* (2013.01)

(58) Field of Classification Search
CPC .............. G06K 19/0727; G02B 27/017; G02B 27/0172; G06F 3/011; G06F 3/048; G06F 3/0484
USPC ....................................... 340/10.1–10.3, 571
See application file for complete search history.

(56) References Cited

U.S. PATENT DOCUMENTS

| | | | |
|---|---|---|---|
| 3,992,786 A | 11/1976 | Greenberg et al. |
| 5,246,643 A | 9/1993 | Inaba et al. |
| 5,600,576 A | 2/1997 | Broadwater et al. |
| 5,864,784 A | 1/1999 | Brayton et al. |
| 6,304,851 B1 | 10/2001 | Kmack et al. |
| 7,173,528 B1 | 2/2007 | Stewart et al. |
| 7,177,821 B2 | 2/2007 | Ikeda et al. |
| 8,281,993 B2 | 10/2012 | Sauerwein, Jr. et al. |
| 2003/0036983 A1 | 2/2003 | Hougen et al. |
| 2004/0107114 A1 | 6/2004 | Curtis |
| 2004/0255236 A1 | 12/2004 | Collart |
| 2006/0136841 A1 | 6/2006 | Fritz |

(Continued)

*Primary Examiner* — Allen T Cao
(74) *Attorney, Agent, or Firm* — F. Chau & Associates, LLC

(57) ABSTRACT

A mobile device configured to enable a user to maintain a facility includes: a display device; a network interface configured to communicate across a computer network with an external computer server to retrieve facility data; an antenna for interrogating an RFID tag; a reader configured to read a response signal generated by the RFID tag in response to the interrogating, process the response signal to extract tag information, determine whether the tag information includes information identifying one of a room within the facility or equipment within the facility; and a processor configured to determine whether the tag information includes a room identifier identifying a room within the facility or an equipment identifier identifying equipment within the facility based on the facility data, retrieve display data from the stored facility data based on the identified information, and present the display data on the display device.

20 Claims, 15 Drawing Sheets

(56) References Cited

U.S. PATENT DOCUMENTS

| | | | |
|---|---|---|---|
| 2007/0033069 A1* | 2/2007 | Rao | A63B 24/00 |
| | | | 705/2 |
| 2007/0219645 A1 | 9/2007 | Thomas et al. | |
| 2009/0251282 A1 | 10/2009 | Fitzgerald et al. | |
| 2010/0281387 A1 | 11/2010 | Holland et al. | |
| 2011/0137713 A1 | 6/2011 | Dalgas et al. | |
| 2012/0023435 A1 | 1/2012 | Kneppers et al. | |
| 2012/0054242 A1 | 3/2012 | Ferrara et al. | |
| 2013/0331963 A1 | 12/2013 | Ahangar et al. | |
| 2016/0035246 A1* | 2/2016 | Curtis | H04L 67/10 |
| | | | 434/219 |
| 2016/0098581 A1* | 4/2016 | Mart Ascencio | G06Q 10/00 |
| | | | 340/5.82 |

* cited by examiner

FACILITY WALKTHROUGH AND MAINTENANCE GUIDED BY SCANNABLE TAGS OR DATA

CROSS-REFERENCE TO RELATED APPLICATION

The present application claims priority to U.S. provisional application Ser. No. 62/089,633 filed Dec. 9, 2014, the entire contents of which are herein incorporated by reference.

BACKGROUND OF THE INVENTION

Technical Field

The present disclosure relates to management of facility operations, and more specifically, to a distributed system that enables a user to collect facility data during a walkthrough of the facility and maintain the equipment within the facility.

Discussion of the Related Art

Operating mission critical facilities may involve monitoring numerous building functions and equipment on a regular basis. If an individual performing such monitoring observes that equipment is operating outside of its designed limits, various steps may need to be taken to correct the situation. Further, comparison of equipment data with benchmark values can provide a reasonable indication that equipment is close to failing or that it is operating near or exceeding its designed limits.

In the event of emergencies, facility component maintenance shutdowns, or other site specific events, facility engineers may be required to complete procedures from memory or using paper instruction. However, since these procedures can be long and complex, they can be difficult for a human operator to perform without assistance. Further, since procedures may change over time, one or more of the operators may not have the most up to date procedure.

Radio frequency (RF) is a wireless non-contact use of radio-frequency electromagnetic fields to transfer data, for the purposes of automatically identifying and tracking tags attached to objects. A barcode is an optical machine-readable representation of data relating to an object to which it is attached. Image recognition is use of computer algorithms to recognize an object from within an image.

However, currently there is no way to make use of RF tags, barcode tags, or image recognition to assist in performing facility walkthroughs and maintenance of facilities.

SUMMARY OF THE INVENTION

According to an exemplary embodiment of the invention, a mobile device is provided that is configured to enable a user to maintain a facility. The mobile device includes: a display device; a network interface configured to communicate across a computer network with an external computer server to retrieve facility data of the facility stored on the computer server; a database configured to store the retrieved facility data; an antenna configured to radiate a radio signal for interrogating an external radio frequency identification (RFID) tag; an RFID reader configured to read a response signal generated by the RFID tag in response to the interrogating, process the response signal to extract tag information, determine whether the tag information includes information identifying one of a room within the facility or equipment within the facility; and a processor configured to determine whether the tag information includes a room identifier identifying a room within the facility or an equipment identifier identifying equipment within the facility based on the stored facility data, retrieve display data from the stored facility data based on the identified information, and present the display data on the display device.

According to an exemplary embodiment of the invention, a mobile device is provided that is configured to enable a user to maintain a facility. The mobile device includes: a display device; a network interface configured to communicate across a computer network with an external computer server to retrieve facility data of the facility stored on the computer server; a database configured to store the retrieved facility data; a sensor configured to retrieve a barcode from a barcode tag; and a processor configured to determine whether the barcode includes a room identifier identifying a room within the facility or an equipment identifier identifying equipment within the facility based on the stored facility data, retrieve display data from the stored facility data based on the identified information, and present the display data on the display device.

According to an exemplary embodiment of the invention, an augmented reality (AR) device is provided that enables a user to maintain a facility. The AR device includes: eyeglasses; a display device; a network interface configured to communicate across a computer network with an external computer server to retrieve facility data of the facility stored on the computer server; a database configured to store the retrieved facility data; a sensor configured to retrieve a barcode from a barcode tag; and a processor configured to determine whether the barcode includes a room identifier identifying a room within the facility or an equipment identifier identifying equipment within the facility based on the stored facility data, retrieve display data from the stored facility data based on the identified information, and present the display data on the display device.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Figure 1:
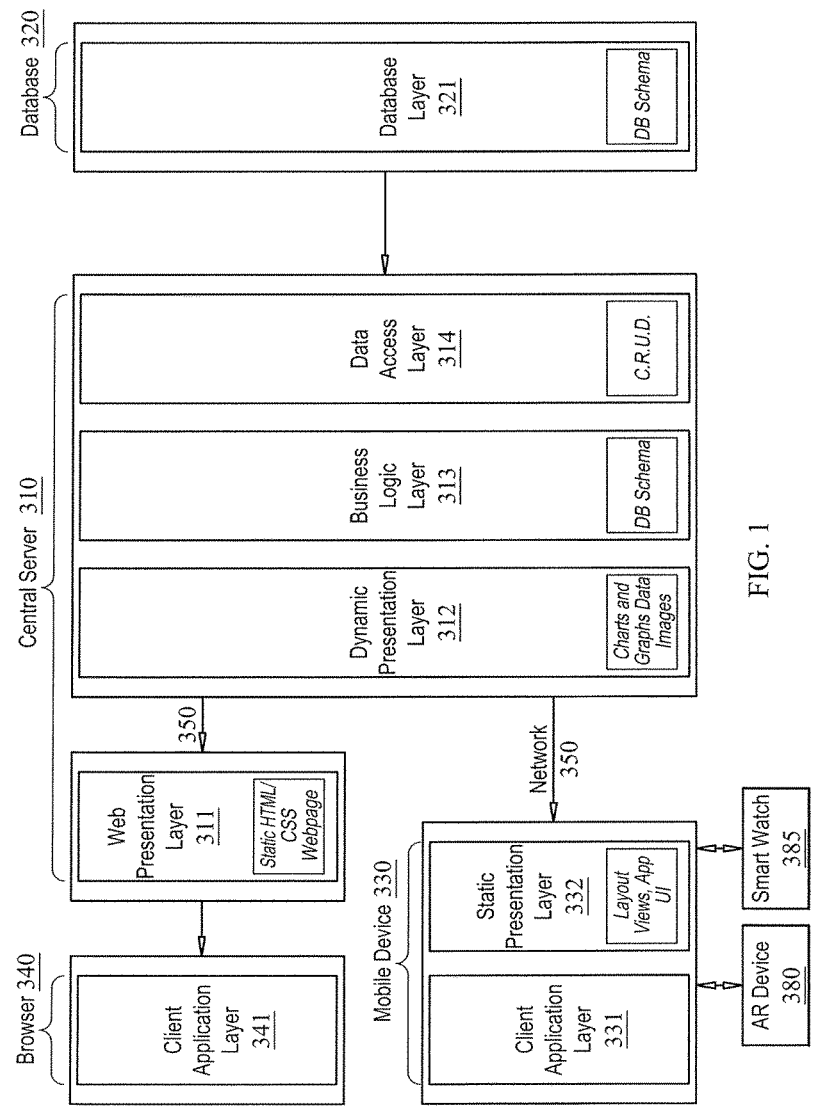
FIG. 1 is a schematic diagram illustrating a system according to an exemplary embodiment of the invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

FIG. 1 illustrates a system having a cloud based server that supports facility management. Referring to FIG. 1, the system includes the server 310, a database 320, one or more remote mobile devices 330, a remote computer 340, and a network 350 (e.g., the Internet). The system may also include an augmented reality (AR) device 380 and/or a smart watch 385 in communication (e.g., wirelessly) with the mobile device 330. Since many areas of a facility may not be accessible over the Internet or not always accessible, the server 310 is configured to gracefully handle loss of connection to the mobile devices 330.

The server 310 includes a web presentation layer 311 to interface with a browser of a remote computer 340. The server 310 further includes a dynamic presentation layer 312 to interface with the static presentation layer 332 of each mobile device 330 and the web presentation layer 311. The server 320 further includes a business logic layer 313 and a data access layer 314 to interface with a database layer 321 of the database 320.

The server 310 has a database 320 that serves as a consistent reference and data bank for documents that applications (e.g., of the mobiles devices 330) can synchronize with. For example, when a mobile device 330 has access to the network 350, it can retrieve data from the database 320 or store data to the database 320.

Technical staff and clients can upload their data (e.g., data captured during a walkthrough) to the server 310 using a mobile device 330 so this data can be synchronized with other data captured by other mobile devices 330. This allows the system to quickly troubleshoot an issue with the data.

Figure 2:
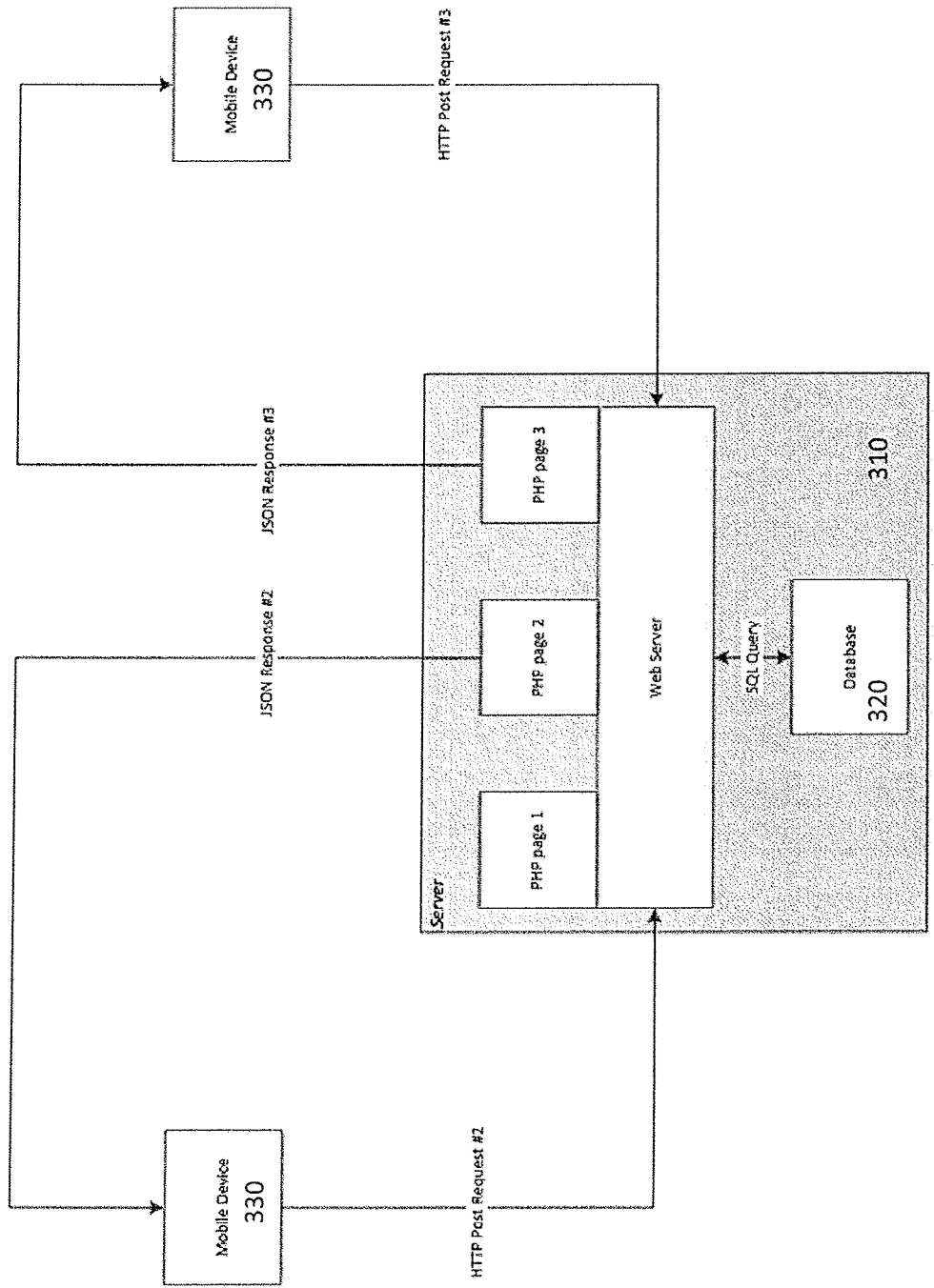
FIG. 2 illustrates a server of the system according to an exemplary embodiment of the invention.

In an exemplary embodiment of the invention, the communication protocol between a client of the mobile device 330 and the server 310 is Java Script Object Notation (JSON). FIG. 2 shows use of JSON to communicate with the mobile devices 330. Each mobile device 330 can make one of several requests to the server 310. A web server of the server 310 maintains a different PHP page for each request. For example, a mobile device 330 can make a request by sending an HTTP Post of a request type that corresponds to the particular request to the web server. The web server, upon determining the request type of the HTTP Post, can forward the POST to the corresponding PHP page, which connects to the database 320 to make queries to respond to the request. The PHP page returns a response to the mobile device 330 that made the request using a JSON response.

The server 310 via the mobile devices 330 facilitates data collection from facility components in a facility, and assists operator in performing procedures on these components.

Examples of the components include an Uninterruptible Power Supply (UPS), a Power Transfer Switch (PTS), Computer Room Air Conditioner (CRAC) units, Generators, Boilers, Chillers, Electrical Switchgear, or any other types of facility components that may be included in a facility's core infrastructure.

Figure 3:
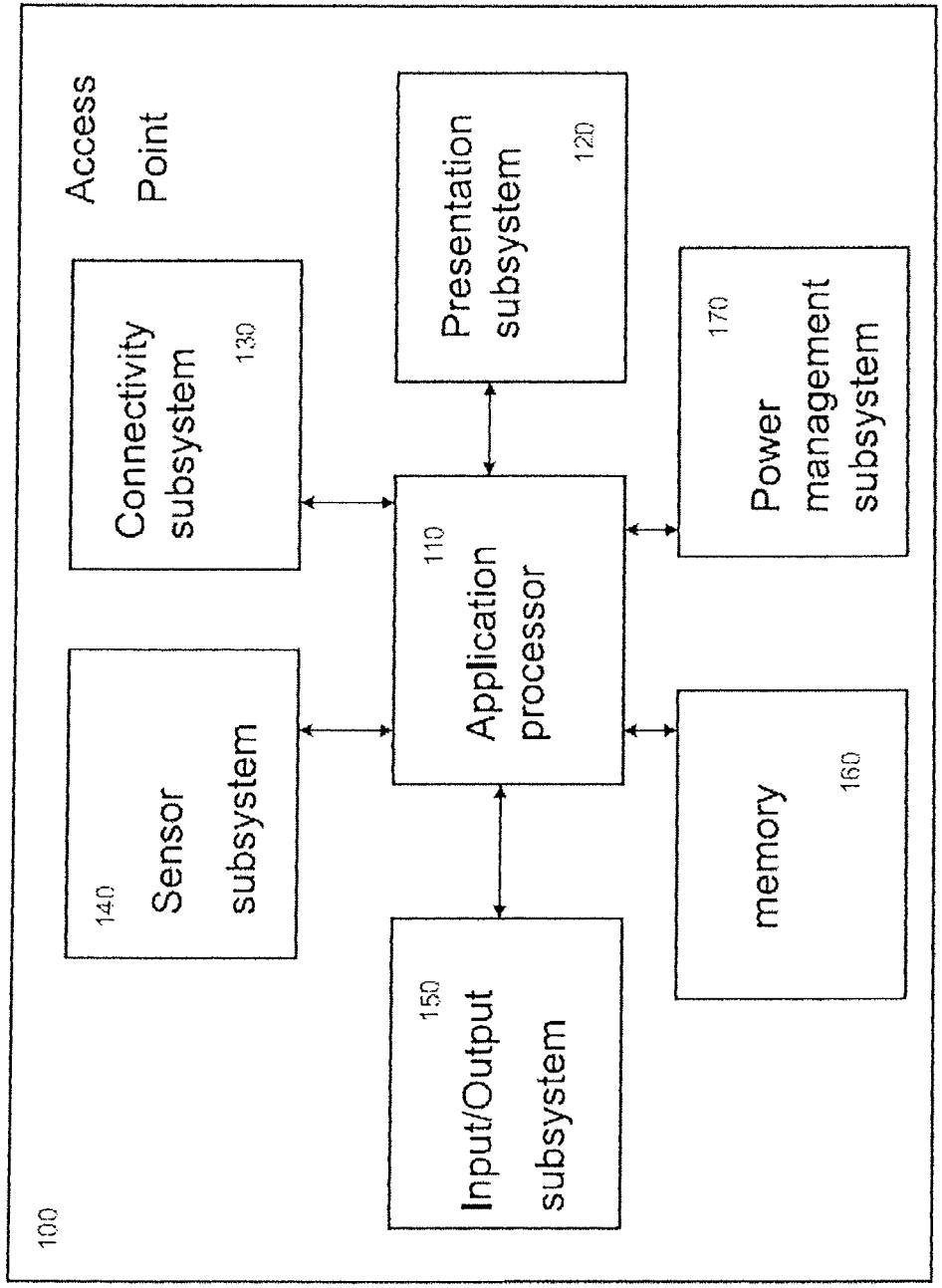
FIG. 3 is a schematic diagram illustrating a client according to at least one exemplary embodiment of the invention.

FIG. 3 is a schematic diagram illustrating an exemplary client 100 in which an exemplary embodiment of the invention may be applied. As an example, the client may be a tablet computer, a mobile phone (e.g., a smartphone), a personal digital assistant (PDA), a laptop computer, a wearable device (e.g., computerized watches, computerized glasses), a cloud based server, etc. For example, the client 100 may be resident on the mobile device 330, the AR device 380, or the smart watch 385.

Referring to FIG. 3, the client 100 includes an application processor 110, a presentation subsystem 120, a connectivity subsystem 130, a sensor subsystem 140, an input/output subsystem 150, a memory 160, and a power management system 170. The client 100 may omit any one of the illustrated elements shown in FIG. 3 or may include additional elements.

The application processor 110 may be configured to execute a computer program that launches the interface, which enables a user to enter data about facility components in one or more facilities, and interprets the entered data to provide feedback to the user. The computer program may be stored in memory 160. The computer program will be discussed in more detail below.

The presentation subsystem 120 may include a sensory based notification mechanism (which may be a visual display, audio speakers, a vibrating mechanism, etc.). The subsystem 120 may include an interface that may enable a user to interact with the application. The interface may be a tactile interface, a biometric interface, or an auditory recognition interface, or any combination between them. The presentation subsystem 120 may include an interface (e.g., an HDMI interface) for output of display images to a remote display, television, etc.

The connectivity subsystem 130 enables the client to communicate with other devices (e.g., a mainframe, a workstation, a server, a database, a desktop computer, a tablet computer, another client, etc.). The connectivity subsystem 130 includes a wireless transceiver that enables the client 100 to wirelessly communicate with the other devices. The connectivity subsystem 130 may include the technology (e.g., suitable hardware and/or software) to exchange data wirelessly (e.g., using radio waves) over a computer network (e.g., the Internet). This technology may enable Wi-Fi communications based on the IEEE 802.11 standard, Bluetooth communications, Near Field Communications (NFC), Radio Frequency Identification (RFID), Infrared, etc.

The sensor subsystem 140 may include one or more sensors, such as an ambient light sensor, a proximity sensor, a global positioning system (GPS), a compass, an accelerometer, a gyroscope, etc.

The input/output (I/O) subsystem 150 may provide an interface to input devices, such as a touch screen, an external keyboard and a mouse, and an interface to an output device such as a printer. The I/O subsystem 150 may include a digital camera controlled by the applications processor 110 or by a controller of the I/O subsystem 150 for capturing images and videos. The images and videos may be stored in a memory or a buffer of the I/O subsystem 150 or the memory 160.

The memory 160 may be embodied by various types of volatile or non-volatile memory devices. For example, the memory 160 may include flash memory, such as an SD card, an MMC card, an eMMC card, hard drive, etc.

The power management subsystem 170 may include a battery, an interface for receiving power from an external power source, software and/or hardware to manage power usage of the client 100, etc. The power management subsystem 170 may include an AC power adaptor for receiving power in a wired manner or a Wireless Power Receiver for receiving power in a wireless manner.

The interface may be used to facilitate the day to day operational tasks associated with running a mission critical facility (e.g., a power plant, or data center) to reduce downtime, streamline benchmarking, enable data collection, and analysis.

When the AR device 380 is present, the server 310 sends information on a granular level based on the scope that the client using the AR device 380 has most recently entered. For example, when a client enters a facility, based on his particular preference during the initial software installation, a configuration will be retrieved from the server 310 to the client specifying how tags are to be read (e.g., using RFID, QR, or manual queue), as well as whether geometries are used or not and to what granularity. As a user enters a sub-area ('area'), or is in the vicinity of a piece of equipment, the server 310 will then request more and more granular information as it is related to the equipment or zone while the client enters different zones, either via sensors specified in the configuration or via his manual pinging.

Information can be retrieved in a row-like format of column data. Depending on the user's configuration (the preference when setting up the user's data), the user can select from a list of equipment as he navigates to more and more granular levels of identifying his area/equipment. If there is data on the server 310, the user will get coordinates, or geometries, as it applies and is available for that facility.

In an exemplary embodiment, the AR device 380 includes an RF infrared/dual camera technology combination, which makes it feasible to distinguish geometries. The AR device 380 will scan the geometries to retrieve its meta data (such as angles, geometries, closest basic overall mesh color of the geometry, etc.). It will send a query to the server 310 with this data periodically to retrieve possible matches. There will be photos of the equipment, and a visual scan with a geometry analyzing function (or API to be used if available) will determine whether there is a similar fit in terms of the number of edges and the number of geometries and scan to the closest percentage (provided by the server).

Figure 4:
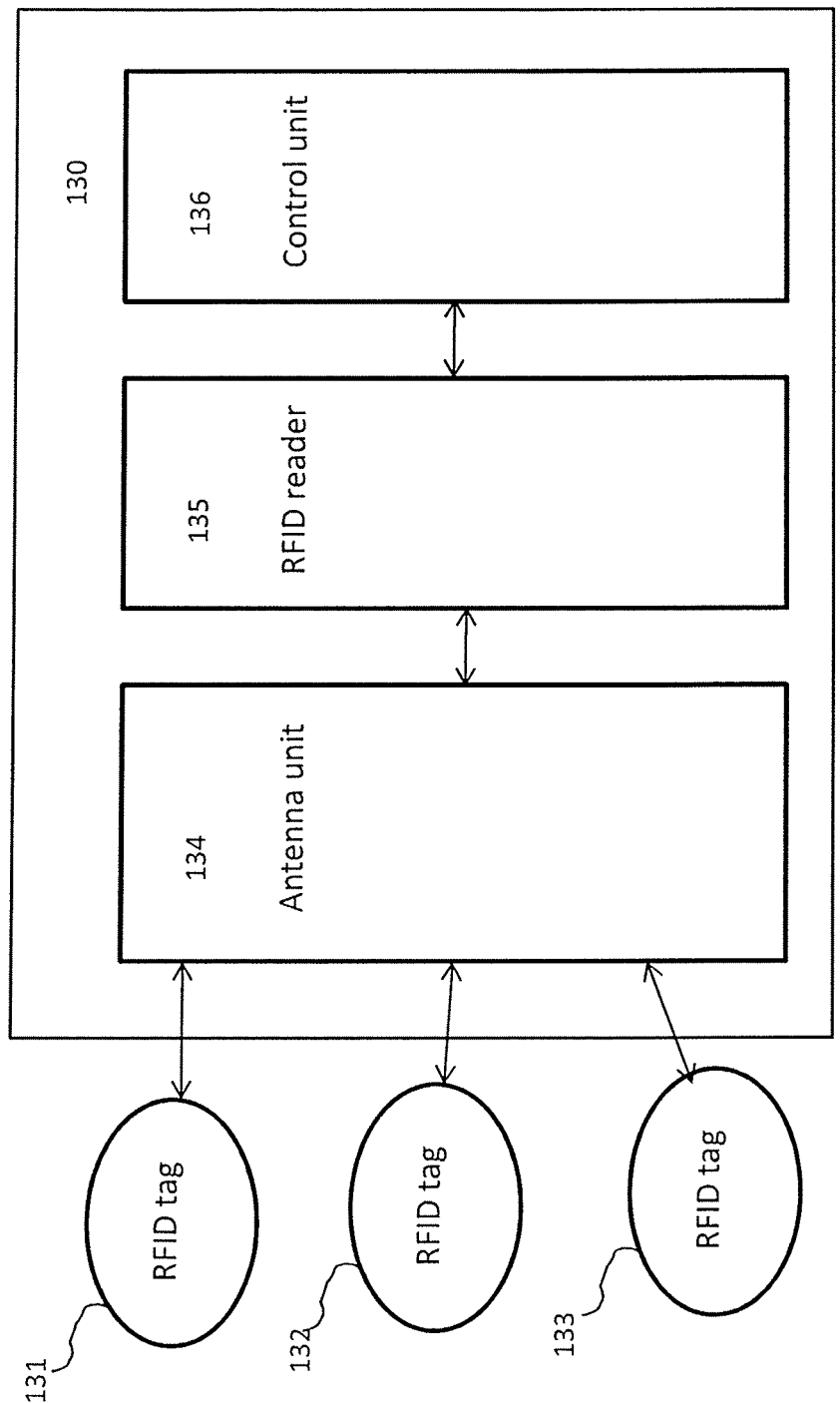
FIG. 4 illustrates a part of a scanning device being used to interface with RFID tags according to an exemplary embodiment of the invention.

FIG. 4 illustrates a part of the connectivity subsystem 130 when it is used to interface with radio frequency identification (RFID) tags 131, 132, and 133. In an alternate embodiment, the RFID tags are near field communication (NFC) tags. While three tags are shown in FIG. 4, the system is not limited to any particular number of tags. As shown in FIG. 4, the embodiment of the subsystem 130 includes an antenna unit 134, an RFID reader 135 (or an NFC reader), and a control unit 136. The antenna unit 134 includes one or more antennas, which are configured to radiate a radio signal that induces a radio signal to be transmitted by the tags 131-133. When the tags 131-133 are passive tags that do not include a separate power supply, the antenna unit 134 under the control of the RFID reader 135 transmits a radio signal, receives radio signals from the tags inductively coupled to the transmitted radio signals, and provides the received radio signals to the RFID reader 135. The RFID reader 135 may include a microcontroller, an oscillator, a power amplifier, a peak detector, a filter, an amplifier, etc. The RFID reader 135 receives a radio signal in an analog form from an antenna of the antenna unit 134, processes the received analog signal to convert the received analog signal into RFID tag information in a digital form, and provides the RFID tag information to the control unit 136. The RFID tag information is information that is included in the radio signals transmitted from the RFID tags.

Figure 5:
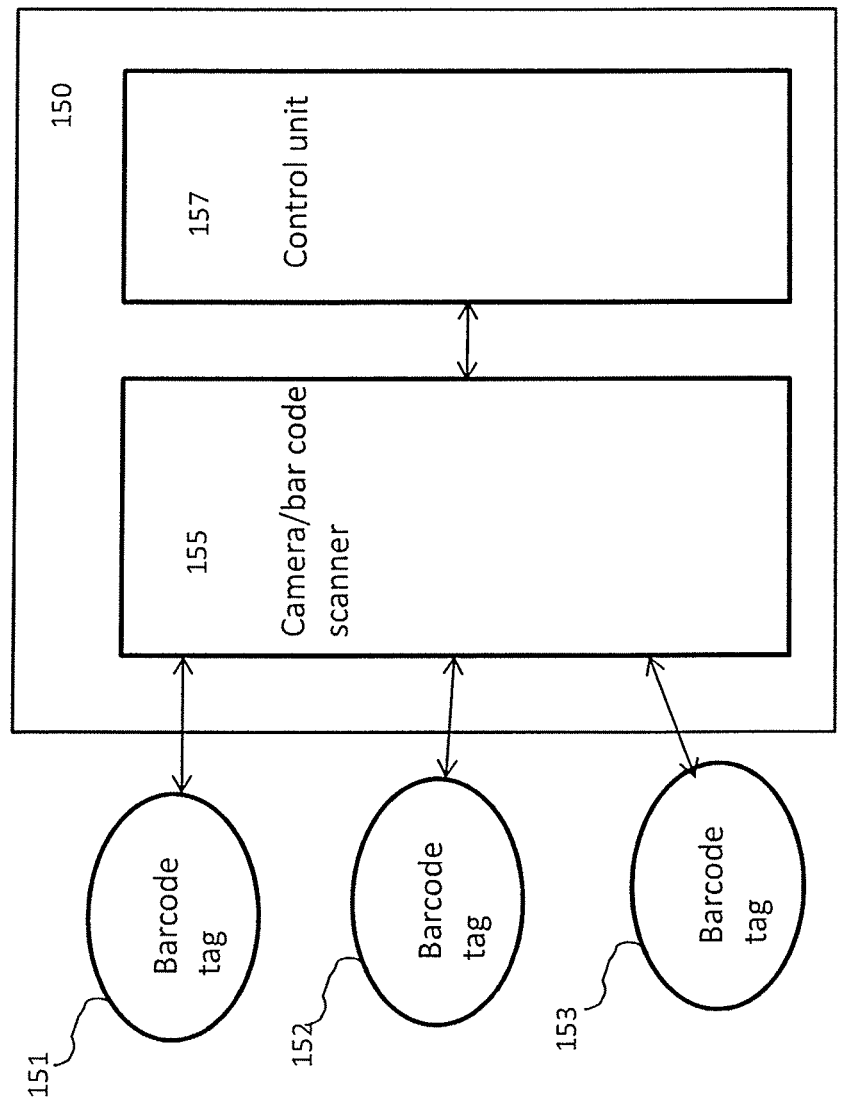
FIG. 5 illustrates a part of a scanning device being used to interface with Barcode tags according to an exemplary embodiment of the invention.

FIG. 5 illustrates a part of the I/O subsystem 150 when it is used to interface with Barcodes tags 151, 152, and 153. Each Barcode tag has a 1 dimensional (1D) or a 2 dimensional (2D) barcode. A quick response (QR) code is an example of the 2D barcode. While three tags are shown in FIG. 5, the system is not limited to any particular number of tags. As shown in FIG. 5, the embodiment of the subsystem 150 includes a camera or a bar code scanner 155 and a control unit 157. The camera/scanner 155 can capture image data of a barcode tag, and send the image data to the control unit 157, which performs an operation on the image data to retrieve tag information.

If a tag (e.g., an RFID tag or a Barcode tag) is placed on a piece of equipment, its tag information may be used to identify the type of the equipment. For example, the type of the equipment is either directly within the tag information or an identifier present in the information is used as an index into a table in memory 160 or the remote server 310 to determine the type of equipment. When the identifier read from the tag placed on the equipment is unique, in addition to indicating the type of the equipment, it can be used to retrieve additional information such as at least one of the identity of the facility, the area, the floor, and the room in which the equipment is located. When the tag is placed on equipment, its tag information may also be used to identify one or more sub-components of the equipment (e.g., each circuit breaker, each switch, etc.), and their positions relative to the scanned tag. When the tag is not placed on equipment, its tag information can be used to identify a particular facility, area, floor, or room.

Figure 6:
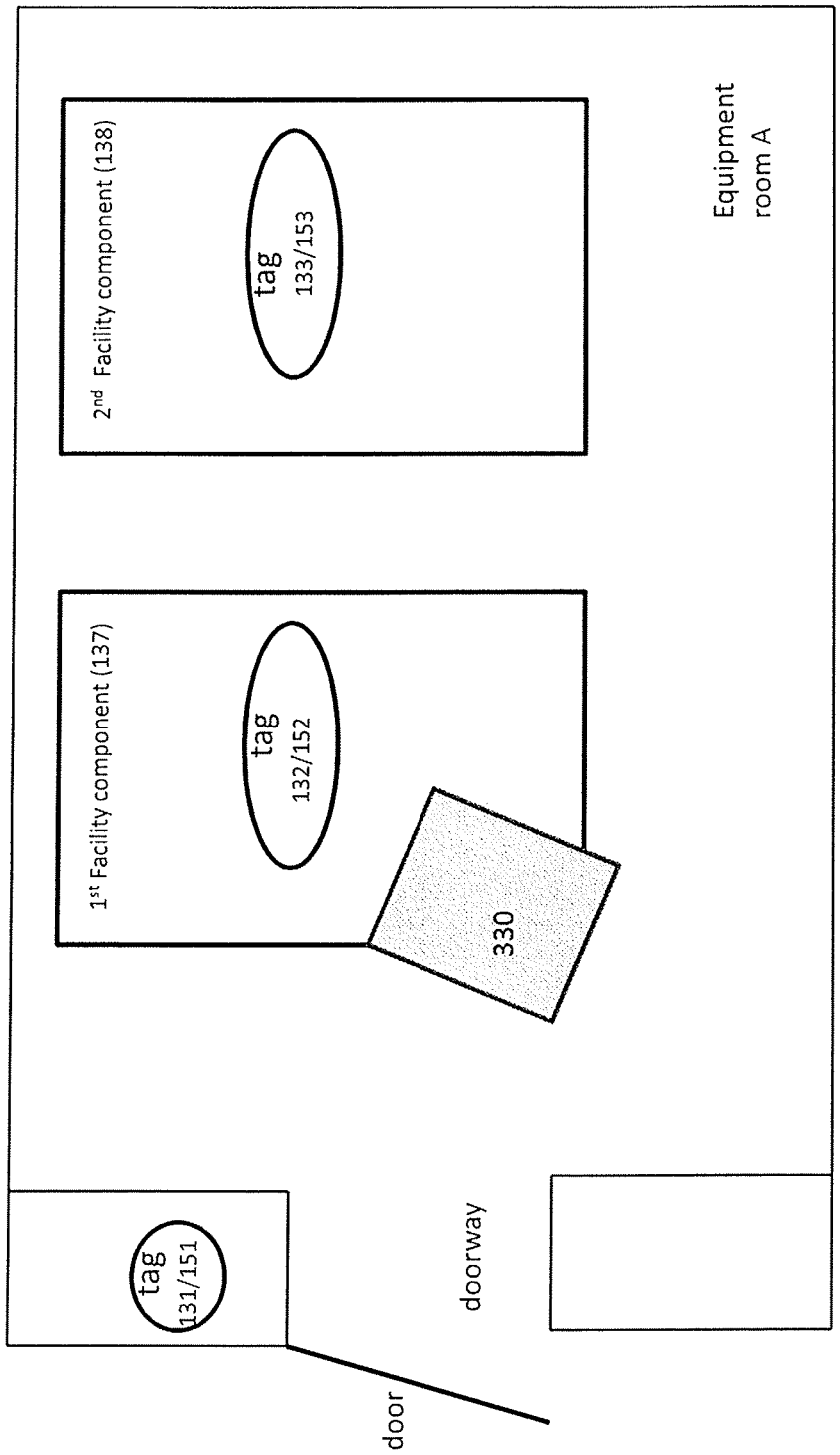
FIG. 6 illustrates an example of RFID or Barcode tags located in a facility, which may be scanned by the mobile device.

FIG. 6 illustrates an example of a first tag (e.g., an RFID tag 131, a Barcode tag 151, etc.) located in a doorway of a room within a facility to identify a particular room within the facility (e.g., equipment room A within facility 1). The user of the scanning device (e.g., 330, 380, 385) scans the first tag (e.g., 131/151) to retrieve its corresponding tag information, which is used to identify the room, or the room and the facility.

For example, if the first tag (e.g., 131/151) identifies equipment room A, upon scanning the tag, the scanning device can infer that a walkthrough for equipment room A is about to occur, and present the user with an interface screen that enables the user to input parameter data for all equipment in the room. The data used to fill the interface screen may be stored in local memory (e.g., 160) or retrieved by the scanning device from a remote memory (e.g., of the server 310) when the Internet is available (e.g., through WiFi). For example, the memory may maintain a table of room identifiers, where each room identifier provides room data that identifies one or more pieces of equipment, one or more parameter fields for the corresponding equipment, one or more parameter data for the corresponding parameter fields, and allowable data ranges for each parameter field. The mobile device 330 can compare the identifier of the first tag against the room identifiers to find a match, and then use the room data of the match to populate the interface screen.

The identity tag 131/151 can also be a beneficial tool for a user unfamiliar with the facility to identify which room they are entering. Location verification is a mission critical asset in times of emergency, and is crucial to supporting emergency response. Not only will a user use the RFID tags to learn their whereabouts in a facility, but in the event of emergency they will be able to bring up a document library with Emergency Action Procedures (EAPs) or Emergency Operating Procedures (EOPs). For example, the interface shown in FIG. 11C may be presented to provide access to the document library.

In another example, upon scanning the first tag (e.g., 131/151), the scanning device determines that a procedure needs to be performed on the equipment within the corresponding room, and presents information to the user that will assist them in performing the procedure (e.g., the steps of the procedure, the next step of the procedure to perform, etc.). Examples of the procedure may include Standard Operating Procedures (SOPS), Emergency Action Procedures (EAPs), Emergency Operating Procedures (EOPs), Maintenance Procedures (MPs), and a Method of Procedures (MOPs). An SOP may include best practice approaches or a set of step-by-step instructions for the day-to-day operation of the equipment (e.g., the facility components). An EAP may include step by step actions which must be done in case of an emergency. For example, an EAP could include a backup plan to aid facility management act swiftly and appropriately to determine/assess/solve the problem and prevent future occurrences of the same problem. An EOP may be designed to alleviate guess work and confusion by establishing a systematic approach for responding to emergencies. The EOP may provide instructions and guidelines for addressing a crisis or natural disasters that may occur. An MP may include guidelines for maintenance to be performed on a specific equipment (e.g., a facility component) or system. An MOP may include step-by-step procedures and conditions, including responsible personnel who should be contacted or be present, documentation, etc. The user could also use the RFID tags to bring up relevant analytics such as graphs, or look at recent alerts related to the tagged equipment.

The procedure or step to be performed may be stored in local memory (e.g., 160) or retrieved by the scanning device 330 from a remote memory (e.g., of the remote server 310) when the Internet is available (e.g., through WiFi). For example, the memory may maintain a table of room identifiers, where each room identifier provides procedure data that identifies the next procedure or single step that is to be performed, and identifies the equipment within the room in which the procedure/step is to be performed. The scanning device 330 can compare the identifier of the first tag against the room identifiers to find a match, and then present the procedure data of the match.

A new tag can be made manually using the server 310. For example, a user can access the database 320 of the server 310 using a remote computer 340 to create an association between a tag ID of the new tag and a facility component of a facility within the database. If the tag ID is not known by the user, the user can use a scanner (e.g., RFID, NFC, barcode) to scan the tag to determine the tag ID for creating the association. The same or another user can then affix the tag to the corresponding facility component.

In an exemplary embodiment, the mobile device 330 enables the user to create new tags. For example, when a scanned tag is not recognized by the mobile device 330, the mobile device 330 is configured to enable to the user configure the scanned tag to identify whether the tag is to identify at least one of a given facility, room, area, floor, a piece of equipment, or sub-components of the equipment. The association can then be relayed to the server 310 for storage so that another mobile device 330 scanning the new tag is able to retrieve its corresponding data.

FIG. 6 also illustrates an example of a second tag (e.g., 132/152) and a third tag (e.g., 133/153) being affixed to first and second facility components 137 and 138 (e.g., different equipment), respectively, to identify the corresponding components.

For example, if the second tag (e.g., 132/152) corresponds to a first UPS, upon scanning the second tag (e.g., 132/152), the mobile device 330 infers that the user wants to enter parameter data for the first UPS, and presents an interface screen to the user that includes only the parameter data entry fields for the first UPS so corresponding parameter data can be entered by the user for the first UPS. The data used to fill the interface screen may be stored in a local memory (e.g., 160) or retrieved by the mobile device 330 from a remote memory (e.g., database 320 of the remote server 310) when the Internet is available (e.g., through WiFi). For example, the memory may maintain a table of equipment identifiers, where each equipment identifier provides equipment data that identifies parameters of the equipment. The mobile device 330 can compare the identifier of the second tag against the equipment identifiers to find a match, and then populate the interface with the equipment parameter entry fields, sliders, pulldowns, etc. from the equipment data of the match so that the user can enter corresponding parameter data.

In another example, upon scanning the second tag (e.g., 132/152), the mobile device 330 determines whether a procedure (e.g., turn on main breaker switch) needs to be performed on the first UPS, and if so, presents the corresponding procedure to the user. For example, the memory may maintain a table of equipment identifiers, where each equipment identifier provides procedure data that identifies the next procedure or single step that is to be performed on the equipment. The mobile device 330 can compare the identifier of the second tag (e.g., 132/152) against the equipment identifiers to find a match, and then present the procedure data of the match.

Figure 7:
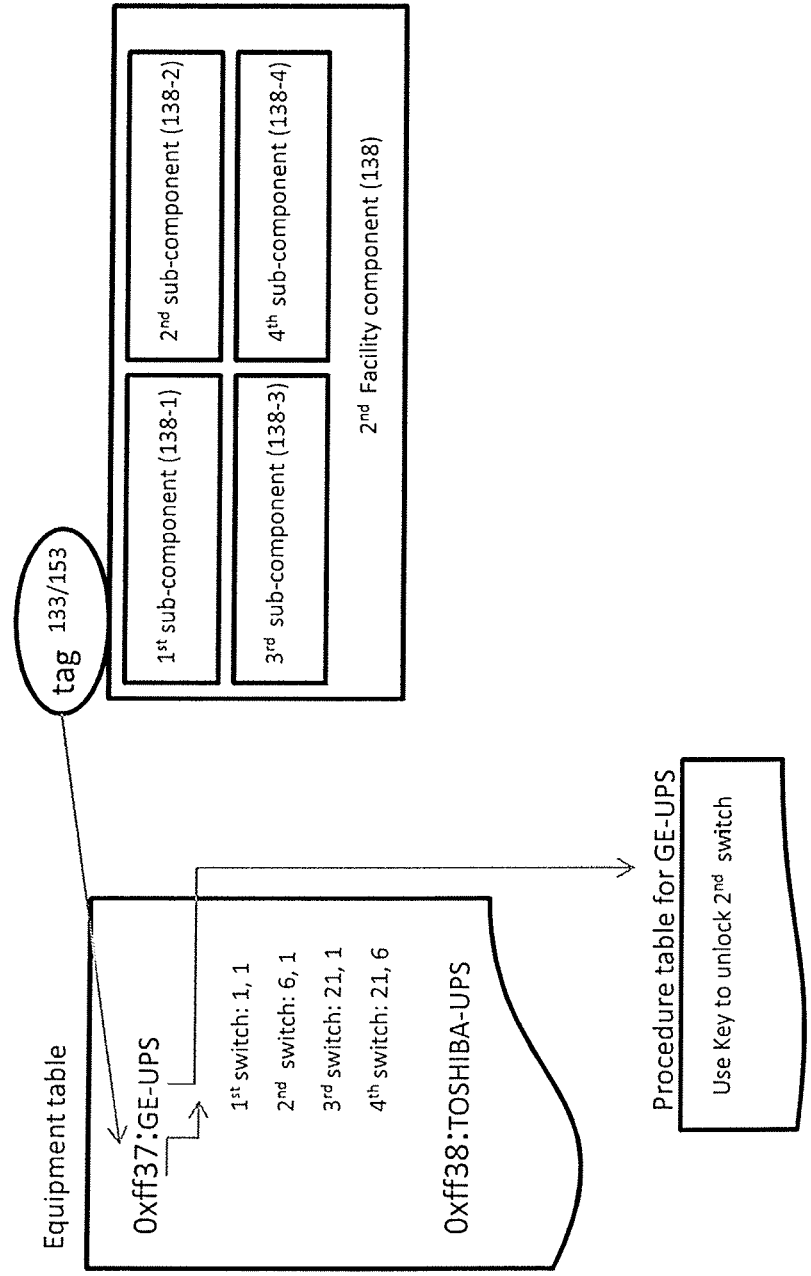
FIG. 7 illustrates an example of tables that may be used by the system to store information associated with scanned tags.

FIG. 7 illustrates an example of the second facility component 138 having multiple sub-components 138-1, 138-2, 138-3, and 138-4, and a third tag (e.g., 133, 153) in FIG. 6 associated with the second facility component 138 identifying its equipment type, and the relative positions of its sub-components. In this example, a scan of the third tag (e.g., 133, 153) by the mobile device 330 returns an ID of 0xff37, which corresponds to an entry of an equipment table managed by the mobile device 330 or the server 310, where the entry identifies the type of the equipment (e.g., a GE UPS), its sub-components (e.g., $1^{st}$-$4^{th}$ switches), and lists the relative locations of each sub-component in a certain unit of measure such as inches, centimeters, etc. For example, the table indicates that the $1^{st}$ sub-component 138-1 is 1 unit over and 1 unit down from the third tag (133, 153), that the $2^{nd}$ sub-component 138-2 is 6 units over and 1 unit down from the third tag, the $3^{rd}$ sub-component 138-3 is 1 unit over and 21 units down from the third tag, and the $4^{th}$ sub-component 138-4 is 6 units over and 21 units down from the third tag.

The equipment table may also list the dimensional extent of each sub-component (e.g., its length and width, its radius, etc.) or a boundary area around the sub-component. For example, the equipment table could list that each sub-component has a 4×19 extent so that the boundary of each sub-component can be derived. For example, with a 4×19 extent, the boundary of the 1st sub-component 138-1 would include an upper left corner with a position of (1, 1) and a lower right corner with position (1+4, 1+19) or (5, 20).

The equipment table may be linked to one or more procedure tables when a next step or procedure needs to be performed. The example shown in FIG. 7 shows that the ID associated with the GE-UPS is linked to a procedure table that indicates a next procedural step of using a key to unlock the 2nd switch (i.e., the second sub-component 138-2).

When the mobile device 330 is located within augmented reality glasses or interfaces with the external AR device 380 including the glasses, a user wearing the glasses is standing in front of or near the third tag (e.g., 133/153), and a next step is scheduled by the system (e.g., server 310) to be performed on the $2^{nd}$ sub-component 138-2, the location and/or boundary of the $2^{nd}$ sub-component 138-2 is calculated as described above to render an image on a screen of the glasses that points to, surrounds, or emphasizes, an area viewed by the user that corresponds to the $2^{nd}$ sub-component 138-2.

Figure 8:
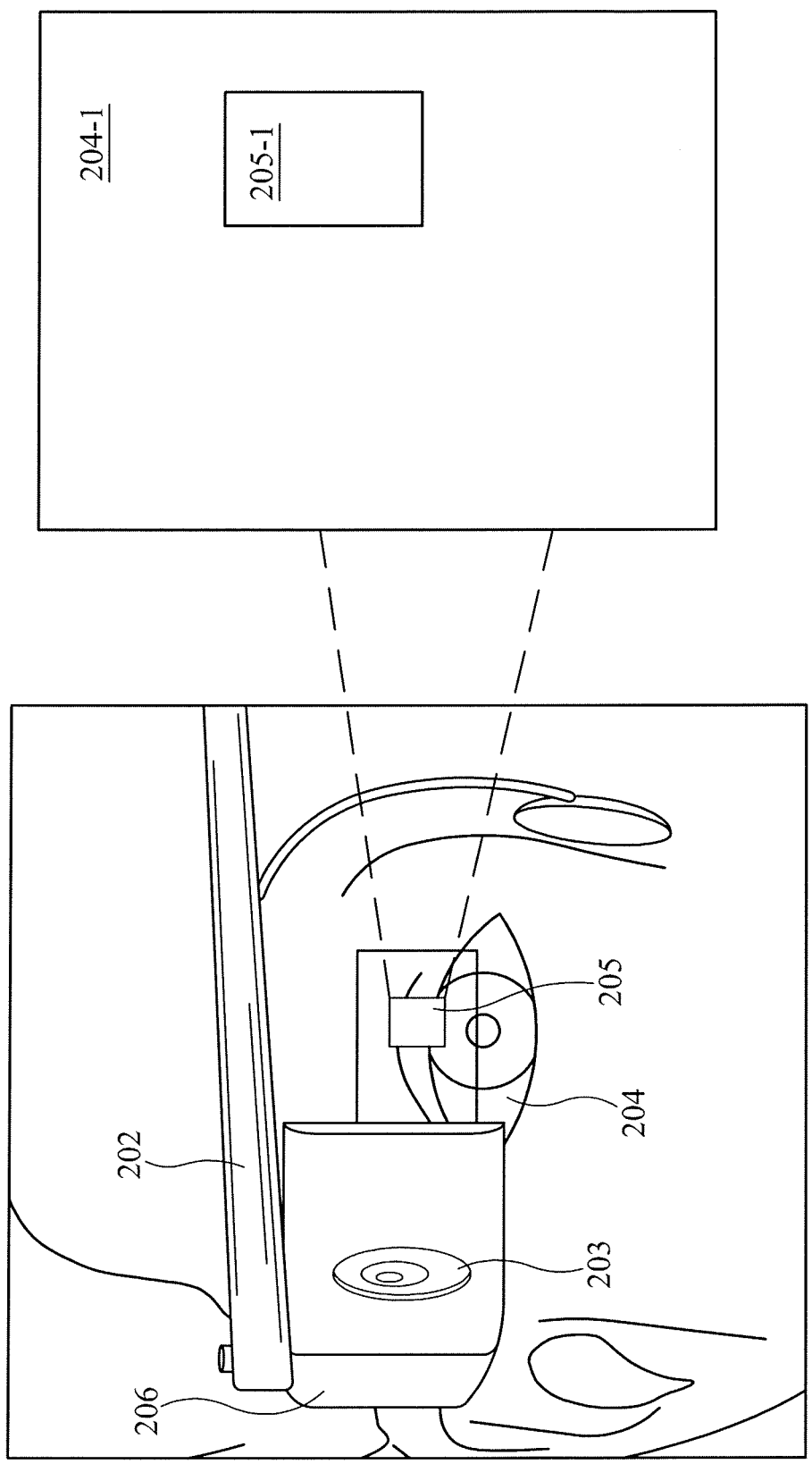
FIG. 8 illustrates an example of an augmented reality glasses that can be used to interface with the system.

FIG. 8 illustrates an example of the augmented reality glasses according to an exemplary embodiment of the invention. Referring to FIG. 8, the glasses include a frame 202, a camera lens 230, a lens 204, a display 205, and a control panel 206 with one or more physical buttons. A user dons the frame 202 like a pair of glasses. The view perceived by the user through the lens 204 is referred to as a lens view 204-1 and the view perceived by the user though the display device 205 is referred to as an augmented view 205-1.

Figure 9:
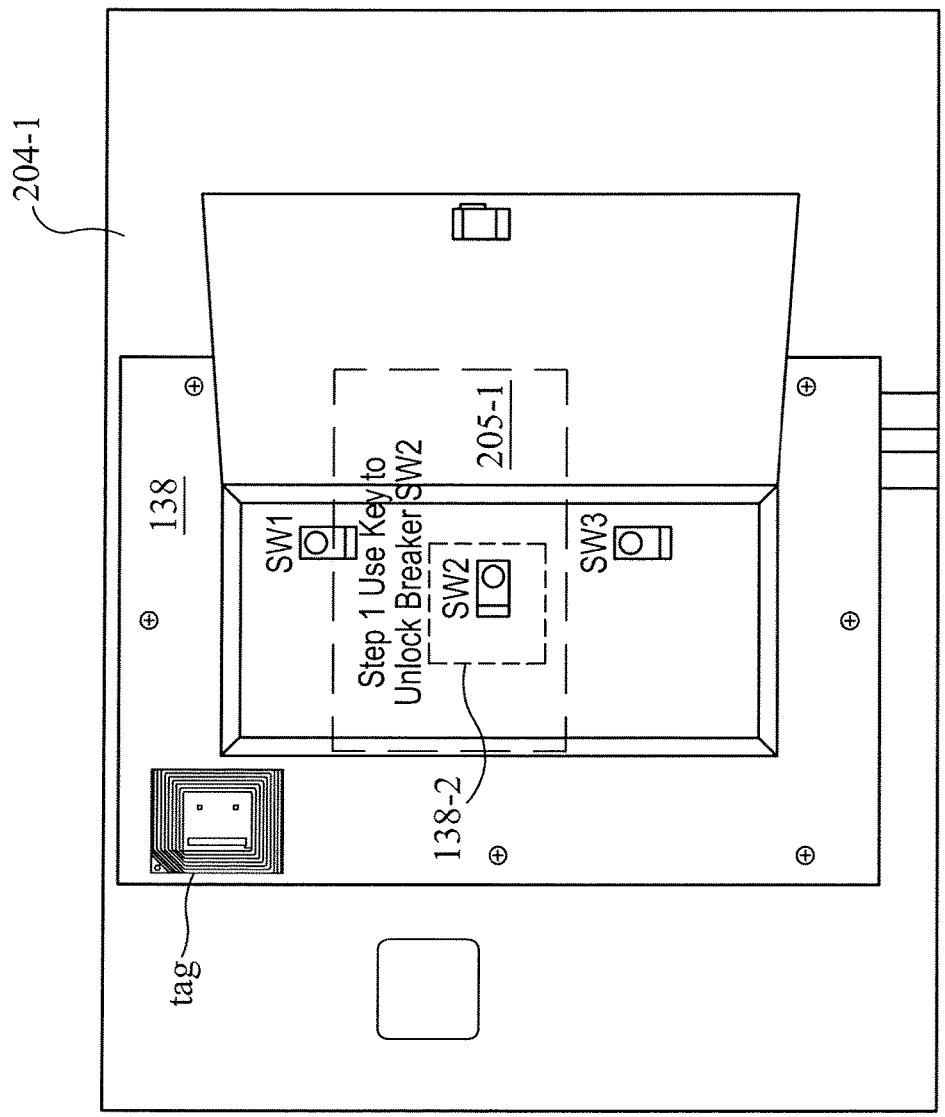
FIG. 9 illustrates an example of using the augmented reality glasses in concert with scannable data.

For example, as shown in FIG. 9, a box having the dimensions of the boundary of the $2^{nd}$ sub-component 138-2 (e.g., see component labeled as SW2) can be presented in the augmented view 205-1 around the $2^{nd}$ sub-component 138-2. Further, the textual instruction of the next step to be performed (e.g., "use key to unlock breaker SW2") can also be presented in the augmented view 205-1. Since the lens 204 is transparent, all objects that would be visible to the naked eye are visible in the lens view 204-1. This augmented data can be triggered to appear when the RFID tag or barcode on the equipment is scanned with the glasses. When there is no augmented data to present, anything that would be visible to the naked eye in the area of the augmented view 205-1 is visible to the user.

Figure 10:
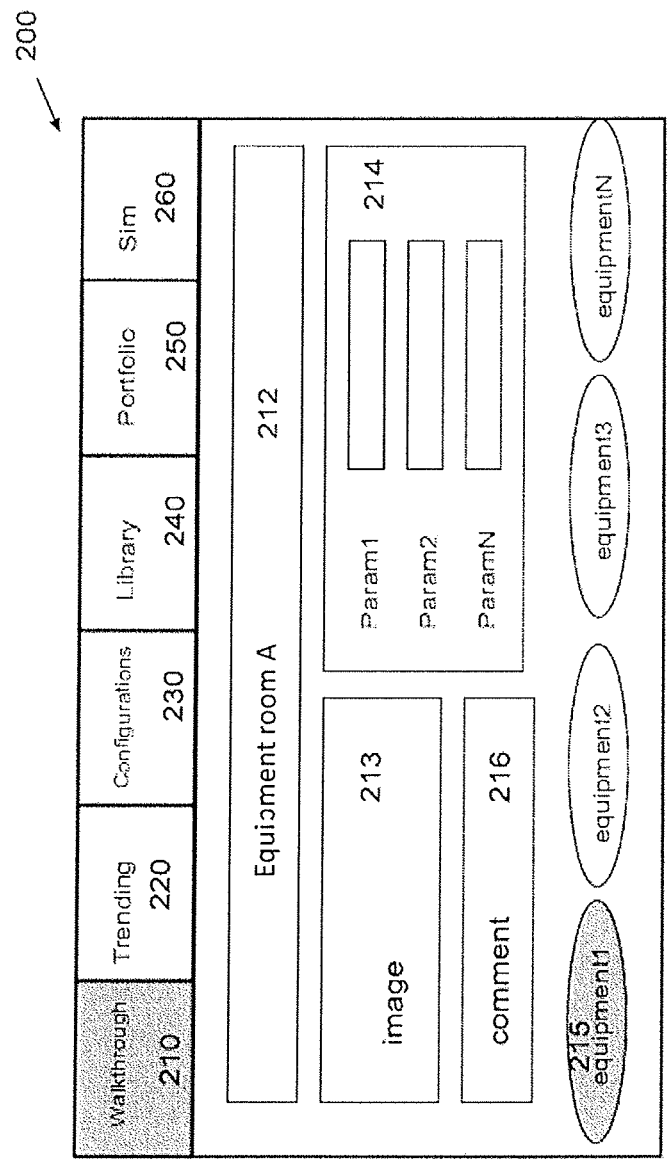
FIG. 10 illustrates an interface that can be presented in response to a scan.

FIG. 10 illustrates an example of a possible graphical user interface (GUI) 200 that may be presented on the mobile device 330 when the user uses the scanning device (e.g., 330, 380, 385) to scan the tag of a room tag (e.g., 131, 153). In this example, the device 330 has inferred that the user wants to perform a walkthrough based on the scan of the room tag 131/153, and accordingly, a tab 210 labeled "walkthrough" is automatically selected, the next facility component 215 for which data is to be entered is automatically selected, the name of the room 212 associated with the tag is automatically presented (e.g., "Equipment room A"), and the data entry fields (e.g., 214, 216) associated with the next component for which data is to be entered are automatically presented. In another example, the same interface 200 may be presented if the user uses the scanning device to scan the tag of equipment (e.g., see 132/152). For example, a first button (e.g., labeled "equipment1") can be automatically selected and presented along with data entry fields for the 1st facility component 137 when the tag of the 1st facility component 137 is scanned. If a tag of the $2^{nd}$ facility component 138 was instead scanned, another button (e.g., "equipment2") would have been instead automatically selected.

An image 213 of the equipment or the facility corresponding to the scanned tag may be presented automatically in the interface 200. When the scanning device includes a camera, the image 213 (or a video) may be captured using the camera. The data entry fields 214 include one or more parameters and data entry fields corresponding to the parameters associated with the selected facility component.

For example, the parameters and corresponding data entry fields for a UPS could include its current battery voltages, currents, power levels, power quality, temperatures, statuses, alarms, etc. In an exemplary embodiment of the invention, the data fields can be one of various field types, such as numeric (e.g., integer or decimal), a text string, an array of choices, or a checkbox. The text string may be input via a keyboard interfaced with the input/output subsystem 150 or a touch screen of the presentation subsystem 120. For example, the array of choices may be a selectable list box or dropdown menu with selectable items. Each item may be associated with or return a unique integer value when selected that corresponds to an index into an array that stores the items of the list/menu. The data field may also be a label with one or more selectable arrow buttons that allow the user to increment or decrement the value on the label by a predefined amount.

Figure 11A:
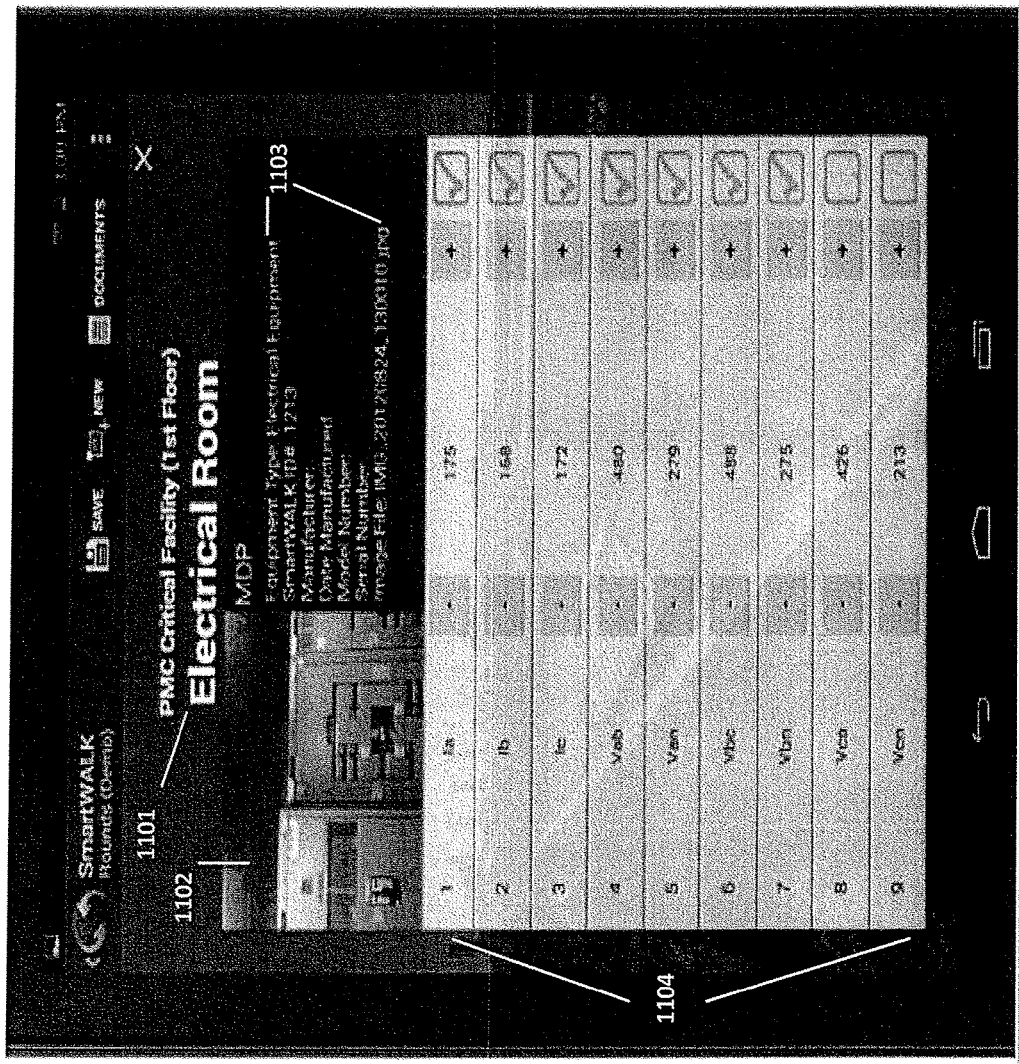
FIG. 11A illustrates an interface that can be presented in response to a scan.

FIG. 11A illustrates an interface that may be presented on the mobile device 330 when a scanning device (e.g., 330, 380, 385) scans a tag with a tag ID representing a particular facility room (e.g., the electrical room) or captures an image of the facility room that is recognized as that facility room. Referring to FIG. 11A, the interface displays a title 1101 of the room, an image 1102 of the room, equipment information 1103 (e.g., model number, serial number, etc.), and equipment parameters 1104. For example, the equipment parameters 1104 are editable equipment parameters, which include a graphical indicator that indicate whether or not the value of the corresponding parameter is consistent with a healthy state. If the data indicates a number outside the calibrated "healthy" parameters, an alert can be displayed. The data for certain rooms or equipment pieces can be updated in real time if a networked meter is connected to the user database to provide readings of voltage, current, power, etc.

Figure 11B:
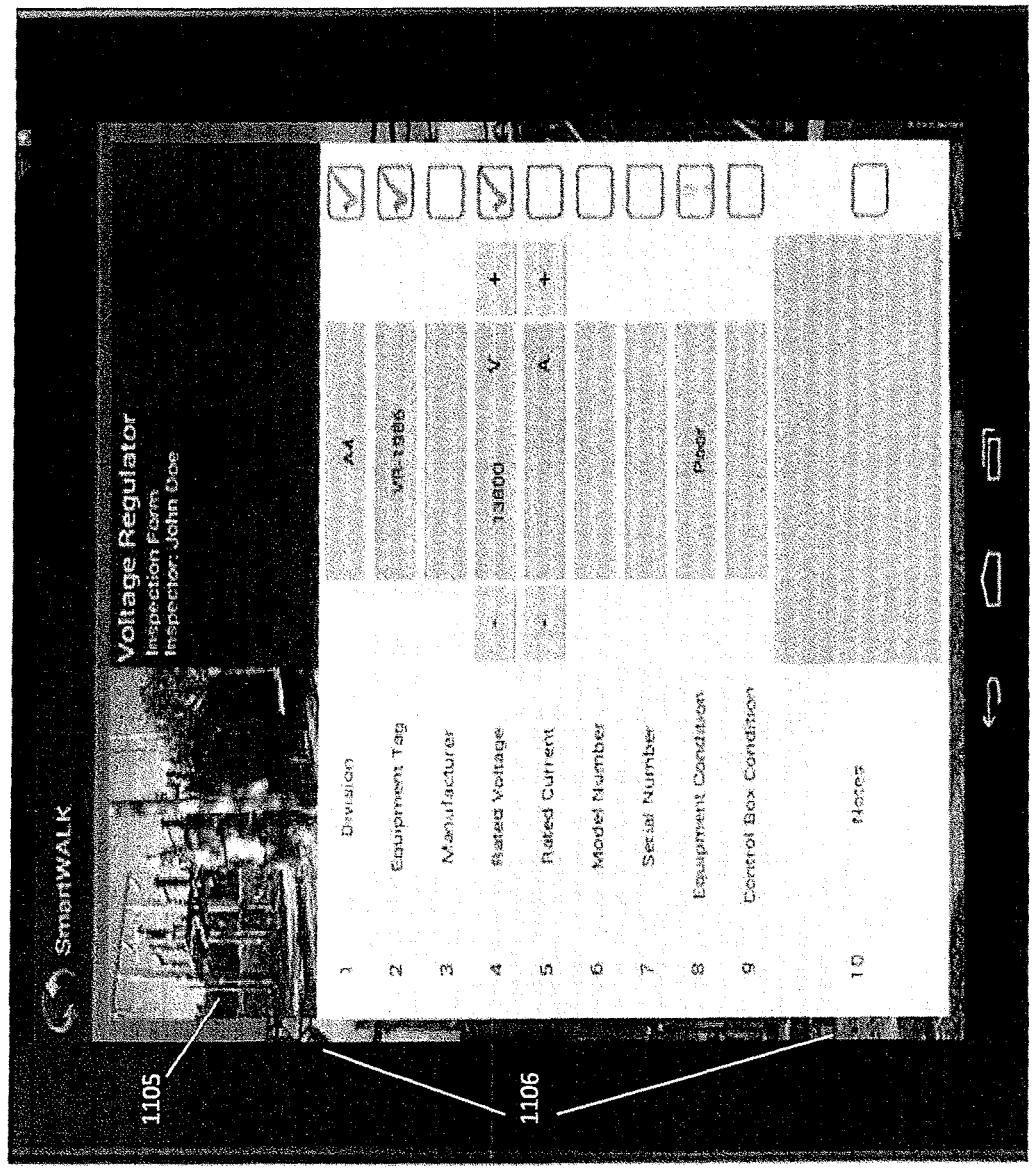
FIG. 11B illustrates an interface that can be presented in response to a scan.
Figure 11C:
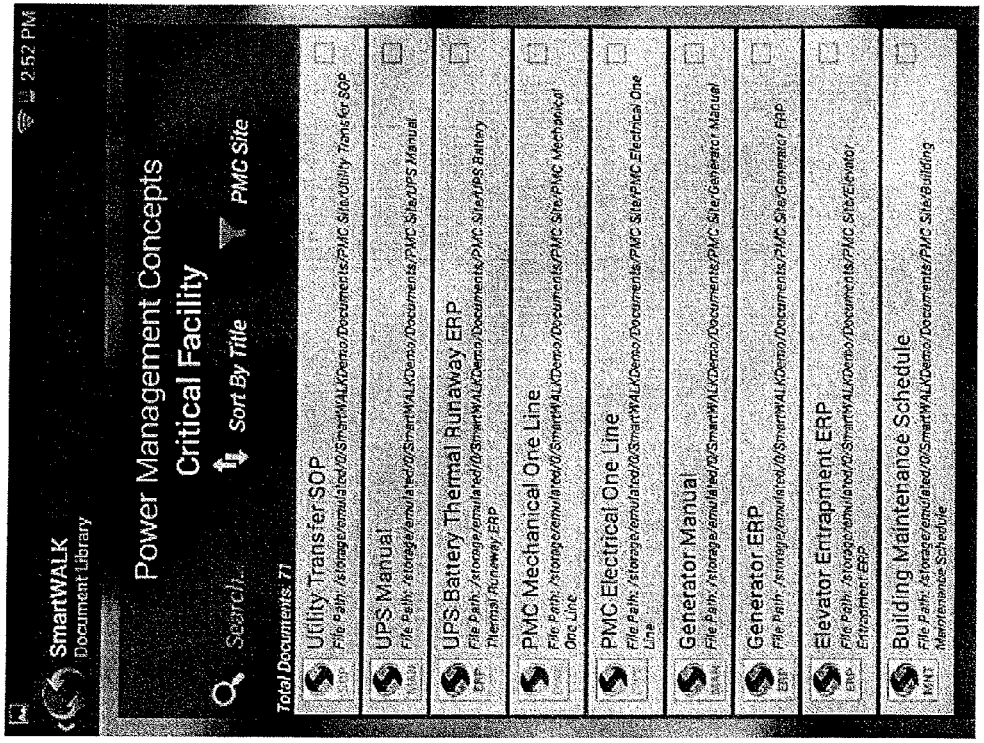
FIG. 11C illustrates an interface that can be presented in response to a scan.

FIG. 11B illustrates another interface that may be presented on the mobile device 330 when the scanning device scans a tag with a tag ID representing a particular facility component (e.g., the voltage regulator) or captures an image of the component that is recognized as that facility component. Referring to FIG. 11B, the interface displays an image 1105 of the facility component and equipment parameters 1105, some of which may be editable. The equipment parameters 1105 may include an indication of the overall equipment condition.

Figure 12:
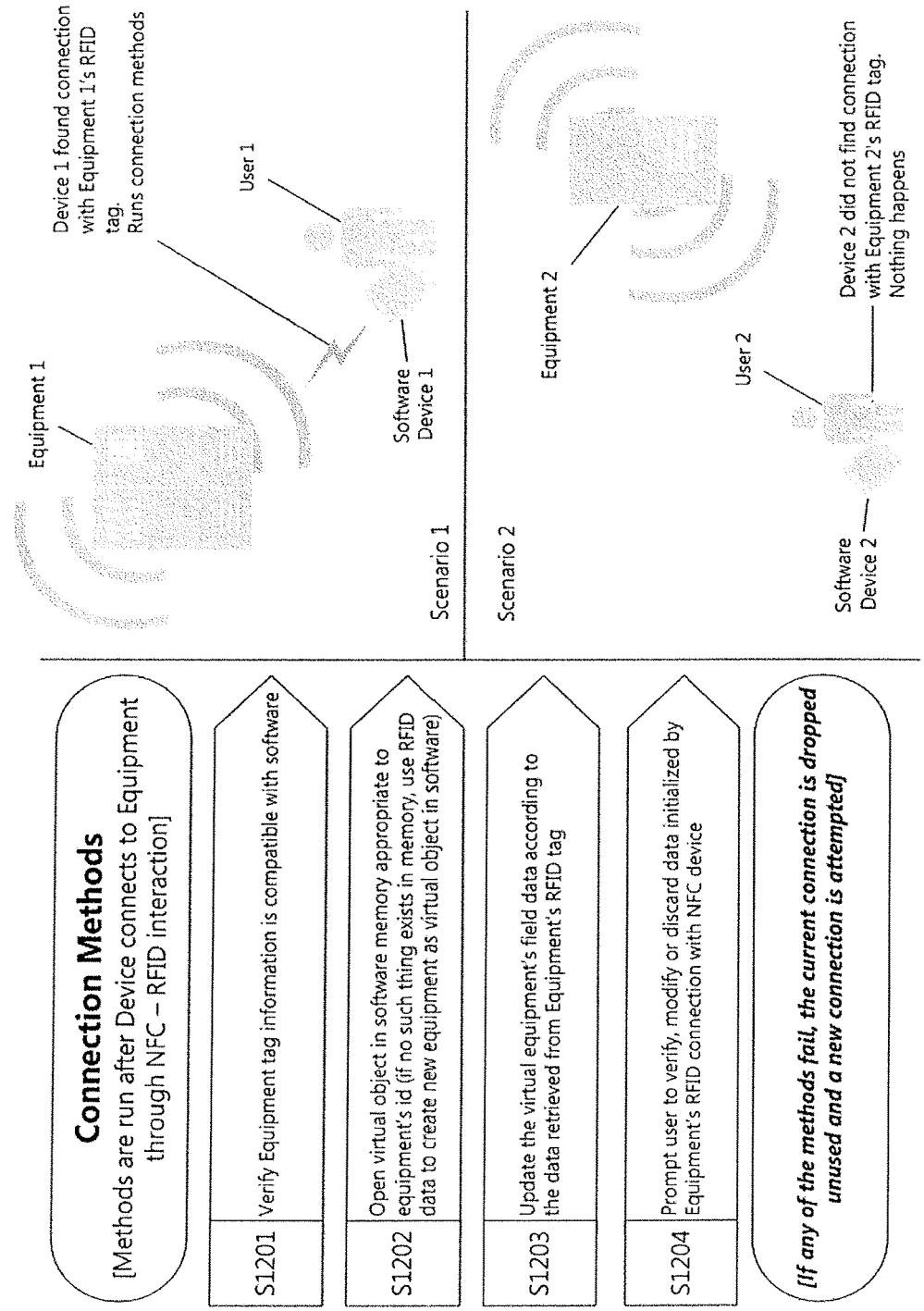
FIG. 12 illustrates an NFC/RFID communication by the system according to an exemplary embodiment of the invention.

FIG. 12 illustrates a method that may be run after the client 100 of the mobile device 330, the AR device 380, or the smart watch 385 connects to facility components using NFC or RFID, according to an exemplary embodiment of the invention. The method may include verifying facility component tag information is compatible with the software of the client 100 (S1201). Next, a virtual object can be opened in memory appropriate to an identifier (ID) of the facility component (S1202). If no ID exists in memory, the current connection can be dropped.

Figure 13:
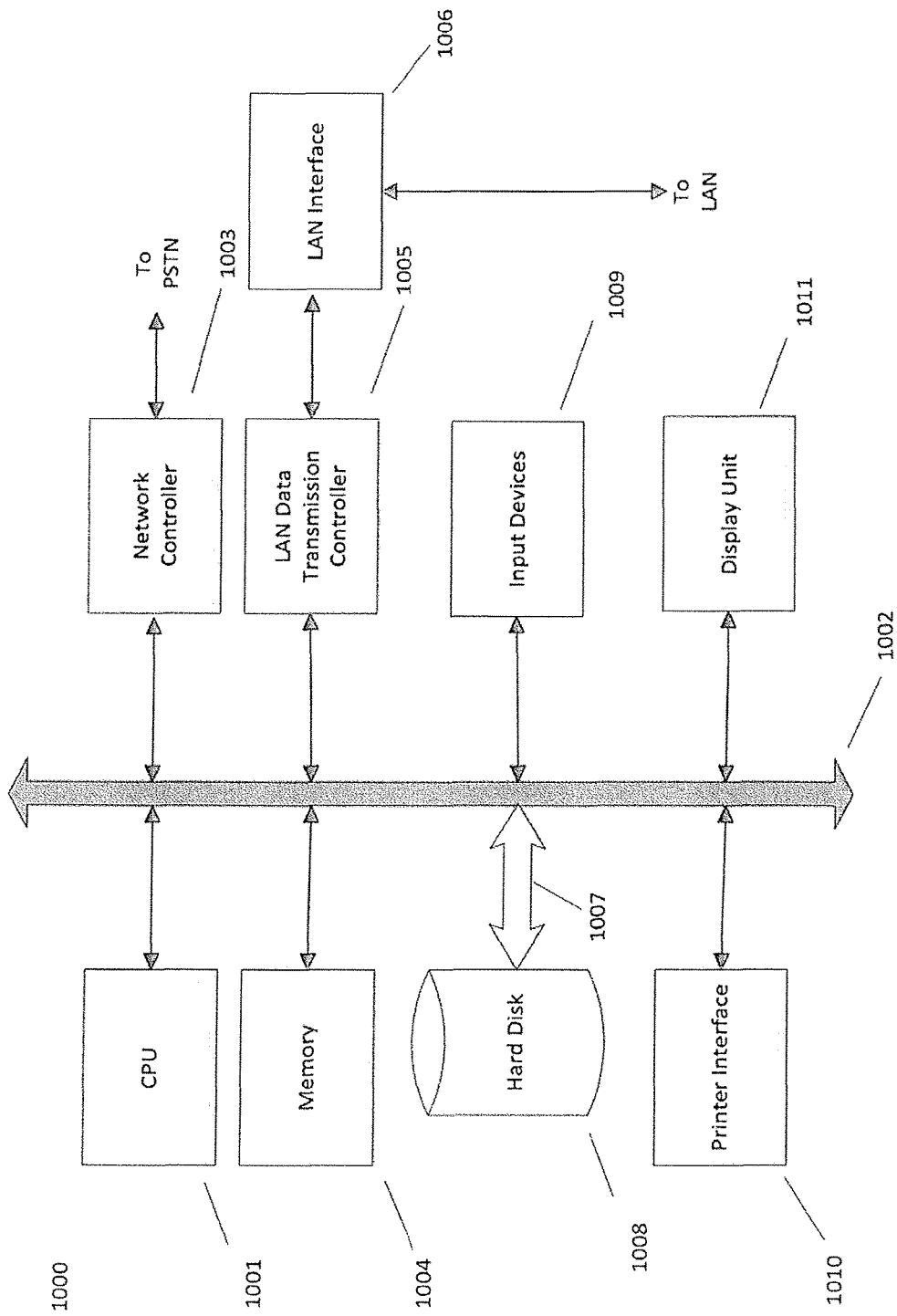
FIG. 13 shows an example of a computer system capable of implementing the method and apparatus according to embodiments of the present disclosure.

As discussed above, embodiments of the invention may be applied to a mobile system. However, the invention is not limited thereto, and may be applied to any computer system, such as illustrated in FIG. 13. The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, touch screen, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A mobile device configured to enable a user to maintain a facility, the mobile device comprising:
   a display device;
   a network interface configured to communicate across a computer network with an external computer server to retrieve facility data of the facility stored on the external computer server;
   a database configured to store the retrieved facility data;
   an antenna configured to radiate a radio signal for interrogating an external radio frequency identification (RFID) tag;
   a RFID reader configured to read a response signal generated by the RFID tag in response to the interrogating, process the response signal to extract tag information, determine whether the tag information includes information identifying one of a room within the facility or equipment within the facility; and
   a processor configured to determine whether the tag information includes a room identifier identifying the room within the facility or an equipment identifier identifying the equipment within the facility based on the stored facility data, retrieve display data from the stored facility data based on the identified information, and present the display data on the display device.

2. The mobile device of claim 1, wherein the facility data includes a plurality of room codes that each identify a corresponding room within the facility and a plurality of equipment codes that each identify corresponding equipment within the facility, the processor determines that the tag information includes the room identifier when the room identifier matches one of the room codes or includes the equipment identifier when it matches one of the equipment codes.

3. The mobile device of claim 1, wherein the facility data includes information about all equipment within the facility, and rooms within the facility in which the equipment is located.

4. The mobile device of claim 3, wherein the display data includes an interface screen that enables a user to input parameter data for all equipment within a room of the facility associated with the room identifier when the tag information includes the room identifier or that enables a user to input parameter data for a single piece of equipment associated with the equipment identifier when the tag information includes the equipment identifier.

5. The mobile device of claim 3, wherein the network interface is connected to a networked meter that is attached to the equipment to provide a continuously updated voltage or current for the equipment, and the display data includes the voltage or current.

6. The mobile device of claim 1, wherein the facility data includes procedures that are to be performed on a plurality of equipment within the facility, and the display data includes a corresponding one of the procedures that is associated with the room identifier or the equipment identifier.

7. The mobile device of claim 1, wherein the facility data indicates a condition of the equipment, and the display data include the condition.

8. The mobile device of claim 1, wherein the facility data includes for at least one of the equipment identifiers, a list of sub-components, and location information of each of the sub-components.

9. The mobile device of claim 8, wherein the location information indicates relative positions of the sub-components to one another.

10. The mobile device of claim 1, wherein a client of the device is configured to verify whether the tag information is compatible with software of the client, and ignore the tag information when it determines the tag information is not compatible with the software.

11. The mobile device of claim 10, wherein upon verifying the tag information is compatible, the client creates a virtual object representative of equipment corresponding to the equipment identifier when the tag information includes the equipment identifier.

12. A mobile device configured to enable a user to maintain a facility, the mobile device comprising:
    a display device;
    a network interface configured to communicate across a computer network with an external computer server to retrieve facility data of the facility stored on the external computer server;
    a database configured to store the retrieved facility data;
    a sensor configured to retrieve a barcode from a barcode tag; and
    a processor configured to determine whether the barcode includes a room identifier identifying a room within the facility or an equipment identifier identifying equipment within the facility based on the stored facility data, retrieve display data from the stored facility data based on the identified information, and present the display data on the display device.

13. The mobile device of claim 12, wherein the sensor is one of a camera or a barcode scanner.

14. The mobile device of claim 12, wherein the facility data includes a plurality of room codes that each identify a corresponding room within the facility and a plurality of equipment codes that each identify corresponding equipment within the facility, the processor determines that the tag information includes the room identifier when the room identifier matches one of the room codes or includes the equipment identifier when it matches one of the equipment codes.

15. The mobile device of claim 12, wherein the facility data includes information about all equipment within the facility, and rooms within the facility in which the equipment is located.

16. The mobile device of claim 15, wherein the display data includes an interface screen that enables a user to input parameter data for all equipment within a room of the facility associated with the room identifier when the tag information includes the room identifier or that enables a user to input parameter data for a single piece of equipment associated with the equipment identifier when the tag information includes the equipment identifier.

17. The mobile device of claim 12, wherein the facility data includes procedures that are to be performed on a plurality of equipment within the facility, and the display data includes a corresponding one of the procedures that is associated with the room identifier or the equipment identifier.

18. An augmented reality (AR) device configured to enable a user to maintain a facility, the device comprising:
- eyeglasses;
- a display device;
- a network interface configured to communicate across a computer network with an external computer server to retrieve facility data of the facility stored on the external computer server;
- a database configured to store the retrieved facility data;
- a sensor configured to retrieve a barcode from a barcode tag;
- a processor configured to determine whether the barcode includes a room identifier identifying a room within the facility or an equipment identifier identifying equipment within the facility based on the stored facility data, retrieve display data from the stored facility data based on the identified information, and present the display data on the display device.

19. The AR device of claim 18, wherein the facility data includes for at least one of the equipment identifiers, a list of sub-components, and positions of each of the sub-components.

20. The AR device mobile device of claim 19, wherein the facility data includes a procedure that is be performed on the equipment within the facility, and the processor displays a graphic on the display device near one of the sub-components involved in a current step of the procedure at a location derived from the corresponding position.

* * * * *